United States Patent
Sammour et al.

(10) Patent No.: US 8,023,453 B2
(45) Date of Patent: Sep. 20, 2011

(54) METHODS AND SYSTEMS FOR PROVIDING RELIABLE MULTICAST SERVICE IN A WLAN SYSTEM

(75) Inventors: Mohammed Sammour, Montreal (CA); Sudheer A. Grandhi, Mamaroneck, NY (US)

(73) Assignee: InterDigital Technology Corporation, Wilmington, DE (US)

(*) Notice: Subject to any disclaimer, the term of this patent is extended or adjusted under 35 U.S.C. 154(b) by 689 days.

(21) Appl. No.: 11/674,391

(22) Filed: Feb. 13, 2007

(65) Prior Publication Data
US 2007/0189207 A1    Aug. 16, 2007

Related U.S. Application Data

(60) Provisional application No. 60/773,004, filed on Feb. 14, 2006.

(51) Int. Cl.
*H04W 4/00* (2009.01)
(52) U.S. Cl. ........ 370/328; 370/349; 370/342; 370/311; 370/345; 370/420; 714/748
(58) Field of Classification Search .................. 370/312, 370/349, 328, 342, 311, 345, 420; 455/574; 714/748
See application file for complete search history.

(56) References Cited

U.S. PATENT DOCUMENTS

| 2004/0184471 | A1* | 9/2004 | Chuah et al. ................ 370/420 |
| 2006/0018332 | A1* | 1/2006 | Kakani et al. ................ 370/428 |
| 2006/0056443 | A1* | 3/2006 | Tao et al. ..................... 370/462 |
| 2006/0107166 | A1* | 5/2006 | Nanda ........................... 714/748 |
| 2006/0171341 | A1* | 8/2006 | Wang et al. .................. 370/311 |
| 2006/0285517 | A1* | 12/2006 | Kakani ......................... 370/329 |
| 2007/0115905 | A1* | 5/2007 | Jokela et al. ................ 370/338 |
| 2007/0147284 | A1 | 6/2007 | Sammour et al. |
| 2007/0274246 | A1* | 11/2007 | Stephens ...................... 370/312 |
| 2008/0112350 | A1* | 5/2008 | Nanda et al. ................. 370/312 |

FOREIGN PATENT DOCUMENTS

WO    2007/052143    5/2007

OTHER PUBLICATIONS

Atheros Communications et al., "Proposed HT MAC Specification," (Oct. 7, 2005).
Information Technology—Telecommunications and information exchange between systems— Local and metropolitan area networks—Specific requirements—Part 11: Wireless LAN Medium Access Control (MAC) and Physical Layer (PHY) Specifications, ANSI/IEEE Std. 802.11, 1999 Edition (R2003).
Kose et al., "WWiSE Proposal: High throughput extension to the 802.11 Standard," IEEE 802.11-04/0886r6 (Jan. 6, 2005).
Mujtaba, "TGn Sync Proposal Technical Specification," IEEE P802.11 Wireless LANs, IEEE 802.11-04/0889r6, XP002347780 (May 2005).
Stephens et al., "Joint Proposal: High throughput extension to the 802.11 Standard: MAC," IEEE 802.11-05/1095r3 (Jan. 12, 2006).

* cited by examiner

*Primary Examiner* — Pierre-Louis Desir
(74) *Attorney, Agent, or Firm* — Volpe and Koenig, P.C.

(57) ABSTRACT

A method for acknowledged multicast operation in a wireless network having a base station and at least one wireless transmit/receive unit (WTRU) includes the base station transmitting a first multicast signal during a first scheduled interval, the at least one WTRU receiving the first multicast signal during the first scheduled interval, and the at least one WTRU transmitting an acknowledgement signal to the base station during a second scheduled interval.

17 Claims, 12 Drawing Sheets

METHODS AND SYSTEMS FOR PROVIDING RELIABLE MULTICAST SERVICE IN A WLAN SYSTEM

CROSS REFERENCE TO RELATED APPLICATION

This application claims the benefit of U.S. Provisional application No. 60/773,004, filed Feb. 14, 2006, which is incorporated by reference herein as if fully set forth herein.

FIELD OF INVENTION

The present invention relates generally to wireless local area networks (WLANs). More particularly, the present invention relates to a method and system for enabling reliable multicast services in a WLAN system.

BACKGROUND

Wireless local area networks (WLAN) have become common today in homes and businesses of all sizes. A standard feature of a WLAN is the ability to multicast. Multicasting means that multiple wireless transmit/receive units (WTRUs) on the network are capable of using one transmission stream at the same time. A specific WTRU can distinguish between the packets that are addressed to it and packets meant for a different WTRU.

This is in contrast to unicast, in which there is a separate transmission stream from source to destination for each recipient. When sending large volumes of data, multicasting saves considerable bandwidth over unicasting. Therefore, the ability of multicast is an important feature, as it may improve the throughput of WLAN systems.

No matter what type of transmission scheme is used, reliability is critical. One method for achieving reliable multicasting is to have some or all recipients acknowledge the receipt of a given multicast frame. The acknowledgement can be in the form of a positive acknowledgement. That is, the recipient sends an acknowledgment that the frame has been received. Alternatively, the acknowledgement can be a negative acknowledgement, which is an acknowledgement that the frame has not been received. Lastly, the acknowledgment can be a combination of both positive and negative acknowledgements.

The IEEE 802.11 standards are a family of specifications for wireless networking that is universally accepted. At present, WLAN systems based on IEEE 802.11 standards do not support reliable multicasting. However, a joint proposal for 802.11n, the high-throughput WLAN standard, is currently under consideration by the IEEE standards body.

The joint proposal includes a power save multi-poll (PSMP) mechanism. The purpose of the PSMP mechanism is to save power in battery operated mobile WTRUs. However, this mechanism may also be used to add multicast reliability to the 802.11n standard. The PSMP mechanism allows handheld WTRUs to conserve battery power by scheduling activity on the wireless medium, rather than transmitting and/or receiving at random intervals. By reserving specific times that the WTRU is allowed to receive or transmit, the WTRU knows that it can "power down" during the non-scheduled times, as it will not be sending or receiving data According to the Joint Proposal specification, and the Enhance Wireless Consortium (EWC) specification, PSMP is defined as a medium access control (MAC) frame that provides a time schedule to be used by the PSMP transmitter and PSMP receivers. The scheduled time begins immediately subsequent to the transmission of the PSMP frame. A downlink transmission (DLT) is defined as a period of time described by a PSMP frame that is intended to be used for the reception of frames by PSMP receivers. An uplink transmission (ULT) is defined as a period of time described by a PSMP frame that is intended to be used for the transmission of frames by a PSMP receiver.

The PSMP frame is utilized to schedule a sequence of downlink transmissions followed by uplink transmissions. Within any single PSMP sequence duration, multiple numbers of additional subsequent PSMPs (Sub-PSMPs) may be transmitted by a base station in order to allow more precise resource allocation and error recovery. An initial PSMP followed by one or more Sub-PSMPs is termed a multi-phase PSMP. A PSMP sequence (scheduled or unscheduled) may be used to transmit broadcast/multicast frames along with unicast frames. Unicast frames are scheduled after broadcast/multicast frames. Broadcast and multicast data can be transmitted using PSMP by setting the STA_ID function to a specific value, such as 0.

FIG. 1 illustrates a typical frame format of a PSMP frame 100 as defined by the 802.11 specification. The frame includes a 16 bit header 112 and multiple 64 bit sub-frames 114. Each of the 64-bit sub-frames 114 corresponds to a single WTRU. Multiple WTRUs can therefore be addressed and configured in a single PSMP frame. Each subframe 114 contains an identifier (STA_ID, 116) for each WTRU addressed by the subframe, downlink and uplink start time offsets (118,120), and downlink and uplink duration time periods (122,124). In this manner, each PSMP subframe 114, schedules, for each WTRU addressed by the subframe, the time in which the WTRU may transmit and receive data.

Another mechanism that may be used to implement multicast acknowledgments is the block acknowledge (BA) mechanism, currently used for acknowledging unicast transmissions. FIG. 2 illustrates a typical enhanced BA mechanism 200. The initiator 202 is the transmitter of the data packets 224. The initiator 202 may aggregate the data packets 224 intended for each recipient. The responder 204 is the recipient of the data packets. Once the data packets 224 are successfully received, a BA signal 200 is forwarded back to the initiator 202. Pursuant to the specification, if the BA frame 200 is sent in response to a block acknowledge request (BAR) frame, the duration/ID frame field 206 value is the value obtained from the duration/ID field of the BAR frame, minus the time required to transmit the BA 200 and its short interframe space (SIFS) interval 208. IF the BA frame 200 is not sent in response to a BAR the duration/ID field 206 value is greater than or equal to the time for transmission of an acknowledgement (ACK) frame plus an SIFS interval 208. The receiver address (RA) field 210 is the address of the recipient WTRU that requested the BA. The transmitter address (TA) field 212 is the address of the WTRU transmitting the BA frame.

The BA control 214 includes 12 reserved bits 216 and a terminal ID (TID) subfield 218. The BA starting sequence control field 220 is set to the same value as in the immediately previously received BAR frame.

The BA Bitmap field 122 is 64 octets in length. It is used to indicate the receiving status of up to 64 MAC service data units (MSDU's). Bit position "n", if set to 1, acknowledges receipt of a MAC physical data unit (MPDU) with an MPDU sequence control value equal to the Block Ack starting sequence control plus the constant n. If the n bit position is set to 0, that indicates an MPDU, with an MPDU sequence control value equal to Block Ack starting sequence control plus n, has not been received. For unused fragment numbers of an MSDU, the corresponding bits in the bitmap are set to 0. As shown in FIG. 2, there is no BAR from the initiator, as it was implied by a setting in the quality of service (QoS) frame.

FIG. 3 illustrates multi-TID block acknowledgement frame format 300. The MTBA is a control frame of the BA subtype. It is used only during PSMP sequences. It consists of a MAC header 302, a BA control 304 and a 16 bit sequence 306 that is repeated for each TID. The MAC header 302 contains a 16-bit frame control field 308, a 16-bit duration/ID 310, a 48-bit RA 312 and a 48-bit TA 314. The BA control 304, is typically 16 bits. It consists of a single bit ACK policy frame 316, a single bit MTID frame 318, a single bit compressed BA frame 320, 10 reserved bits 322 and a 3-bit number of TID frame 324. Repeated for each TID is a 16-bit BA control per TID frame 326, a 16 bit BA starting sequence control frame 330, a 32 bit BA bitmap 330 and a 32 bit Frame Checksum (FCS) 332. A MTBA 300 allows for single frame to respond to all BARs for multiple TID. It is used only within PSMP sequences instead of BA.

FIG. 4 illustrates a typical PSMP sequence 400. The PSMP frame 402 specifies the time allotted for DLT1 404, DLT2 406 and ULT1 408 and ULT2 410. The frame is transmitted prior to every DLT/ULT sequence. As shown in FIG. 4, the PSMP frame 402 is transmitted first, then DLT1 404 is transmitted for the time allotted in the PSMP frame. The ULT1 408 is transmitted in the time allowed by the PSMP frame, and the sequence repeats.

FIG. 5 illustrates an example of a PSMP resource request 500 and FIG. 6 illustrates an example of a PSMP retransmission 600. Referring to FIG. 5, the PSMP sequence allows the base station 502 (designated as access point (AP)) to create effective service periods for scheduled automatic power save delivery (S-APSD). The PSMP sequence provides benefits such as statistical multiplexing of retries, activity cycles and rate variations. In voice over internet protocol (VoIP) applications, the benefit is up to twice the throughput, resulting from sharing an allocation for retries within the current aggregate service point.

Some recent proposals to the standards committees have included new rules for PSMP operation. Some of these rules pertain to access point or base station operation. As an example, rules have been proposed that the specification only includes stations (WTRUs) within PSMP if the WTRU is capable, as advertised in the WTRU's high throughput (HT) capabilities. Also, the base station should obey rules regarding minimum times between DLT and ULT. Also, the base station may set bits in "TID set" field to provide recommendations to the WTRU for use of ULT. Additionally, the base station should use end of service point (EOSP) bits to signal the end of data delivery to a WTRU. The base station gives the WTRU permission to return to sleep in order to conserve power.

Other proposed rules include that the ACK policy setting in DLT frames is "PSMP/MTBA". Other proposed rules include rule regarding Service Interval Granularity to include SIG advertised by the Base Station to allow the WTRU to determine appropriate Traffic Specification (TSPEC) service interval request to match Base Station PSMP service intervals. Also, the PSMP may be used in context of unscheduled (U)-APSD or scheduled (S)-APSD.

SUMMARY

The present invention is directed to a method and system for introducing reliable multicast service to an 802.11n compliant WLAN by transmitting the multicast acknowledgements as part of the usual uplink transmission (ULT) phase of the PSMP. The PSMP schedules some or all of the intended broadcast/multicast recipients during the ULT phase. The scheduling may be recipient by recipient, or collectively during the ULT phase. For example, the PSMP frame may allocate ULT schedules for each of the intended broadcast/multicast recipients so that they can send their broadcast/multicast acknowledgements. In addition, the base station may transmit repeat multicast/broadcast frames or schedule multiple broadcast/multicast periods in the context of PSMP sequences.

BRIEF DESCRIPTION OF THE DRAWINGS

A more detailed understanding of the invention may be had from the following description of a preferred embodiment, given by way of example and to be understood in conjunction with the accompanying drawing(s) wherein.

DETAILED DESCRIPTION OF THE PREFERRED EMBODIMENTS

Although the features and elements of the present invention are described in the preferred embodiments in particular combinations, each feature or element can be used alone (without the other features and elements of the preferred embodiments) or in various combinations with or without other features and elements of the present invention.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (Base station), or any other type of interfacing device capable of operating in a wireless environment.

Although the embodiments of the present invention described hereafter refer to "multicast", they apply equally to both "multicast" and "broadcast".

The present invention is directed toward a method and system for introducing reliable multicast service to an 802.11n wireless local area network (WLAN). Reliable multicast generally refers to acknowledged multicast, whereby either positive or negative acknowledgements (ACK, NACK) are transmitted by one or more of the intended recipients to indicate the receipt or lack of receipt of one or more frames, respectively.

Figure 7:
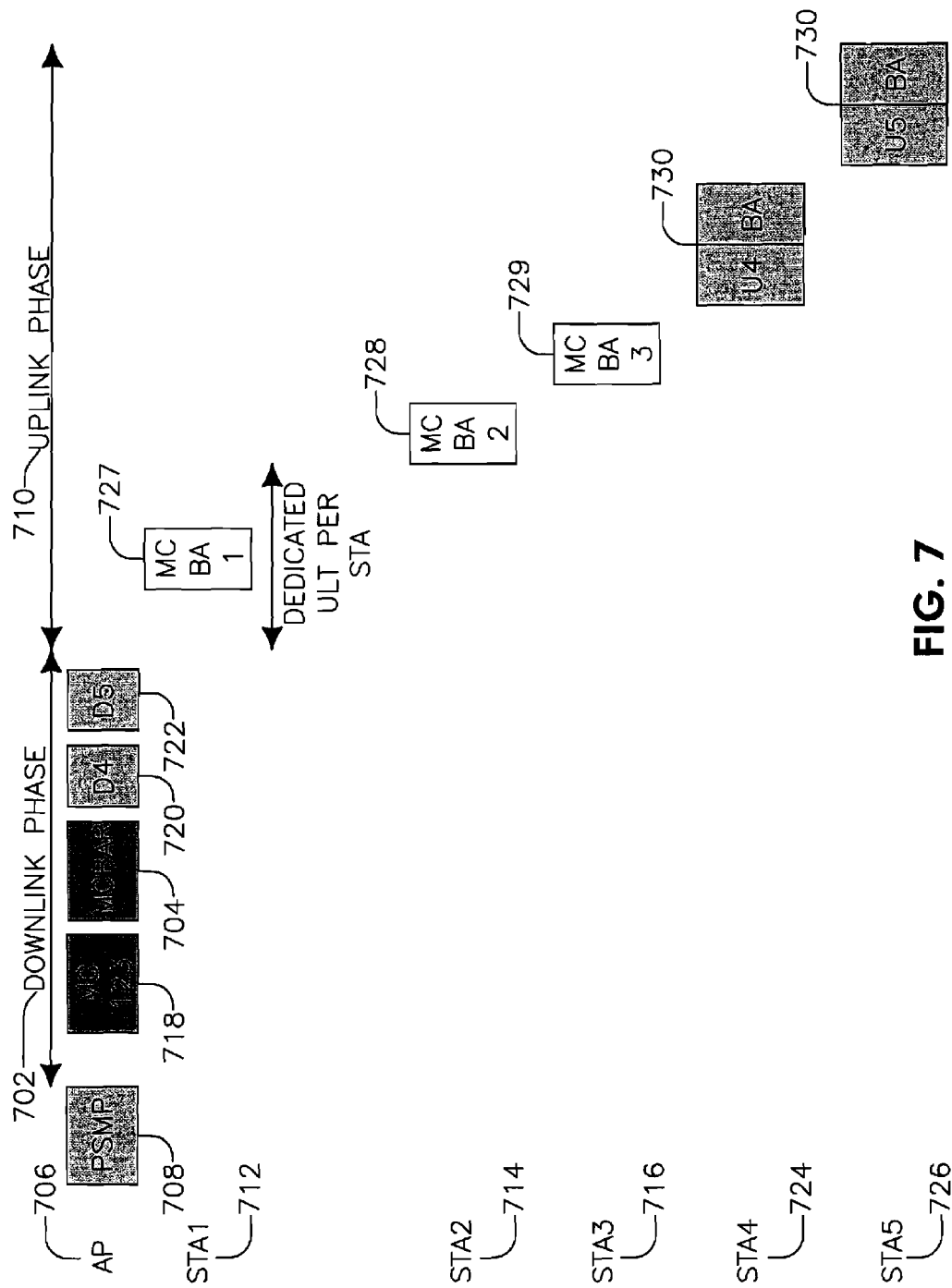
FIG. 7 is a signal diagram of an acknowledged or reliable multicast in accordance with the present invention.

FIG. 7 is a signal diagram of an acknowledged or reliable multicast in accordance with the present invention. In the downlink phase 702, a multicast block acknowledge request (MCBAR) 704 is introduced, in addition to the 802.11n specified functions. The MCBAR 704 may be an enhanced version of a block acknowledge request (BAR) and a multiple TID block acknowledge request (MTBAR). The MCBAR 704 may also be an enhanced version of a BA and MTBA functions.

The MCBAR 704 is an enhanced function in that it supports multicast. Within the MCBAR 704 function, the multicast support may be accomplished by identifying a multicast flow or TID. Multicast support may also be accomplished via specifying the multicast frame's sequence numbers (SNs).

Typically, and preferably, referring now to FIG. 7, an AP 706 transmits the MCBAR 704 as part of the PSMP downlink phase 702. In other words, the transmission of the MCBAR 704 function is scheduled by the PSMP function 708 for a particular downlink time period. The AP 706 also schedules a dedicated PSMP uplink phase 710 for some or all stations that are intended to receive the multicast frames as part of the PSMP sequence's 708 uplink phase 710. In the present example, STA1 712, STA2 714 and STA3 716 are intended to receive the multicast frame. Alternately, the AP 706 may schedule a dedicated PSMP ULT for some or all of stations 712, 714, 716 that were intended to receive the multicast frames as part of another PSMP phase.

As illustrated in FIG. 7, during the downlink phase of the PSMP 702, a multicast signal 718 (MC123) is transmitted to STA1, STA2 and STA3 from the AP 706. Also, the MCBAR 704 signal is transmitted, requesting an acknowledgement from the multicast recipients. Finally, unicast signals 720 (D4) and 722 (D5) are transmitted to STA4 (724) and STA5 (726).

During the scheduled uplink phase 710, and in response to the MCBAR function 704, each of STAT. STA2 and STA3 transmit an multicast block acknowledge (MCBA) to the AP 706. The MCBA signals are illustrated in FIG. 7 as MCBA1, (727), MCBA2, (728) and MCBA3 (729). The MCBA typically is transmitted in a portion of the uplink phase 710 that is dedicated to transmitting acknowledgments and has been scheduled by the PSMP 708.

After STA1, STA2 and STA3 have transmitted their MCBAs, STA4 and STA5 transmit their unicast BAs 730 to the AP 706. The acknowledgements need not be positive and may be negative, meaning no receipt of the multicast signal. Since the PMSP 708 schedules a time for STA1, STA2, and STA3 to acknowledge the frame, it is expected that STA1, STA2 and STA3 each will be receiving a frame. Therefore, if one is not received, a negative acknowledge may be transmitted to the AP 706 by any of STA1, STA2 or STA3.

Alternatively, a predetermined bitmap can be set up to represent whether a frame is received. The AP 706 conducts retransmissions based on the acknowledgment information, either in multicast mode or unicast mode. The retransmissions are sent only to those stations that did not receive the first multicast frame. The AP 706 conducts retransmissions either as part of another PSMP sequence or outside a PSMP sequence.

Figure 8:
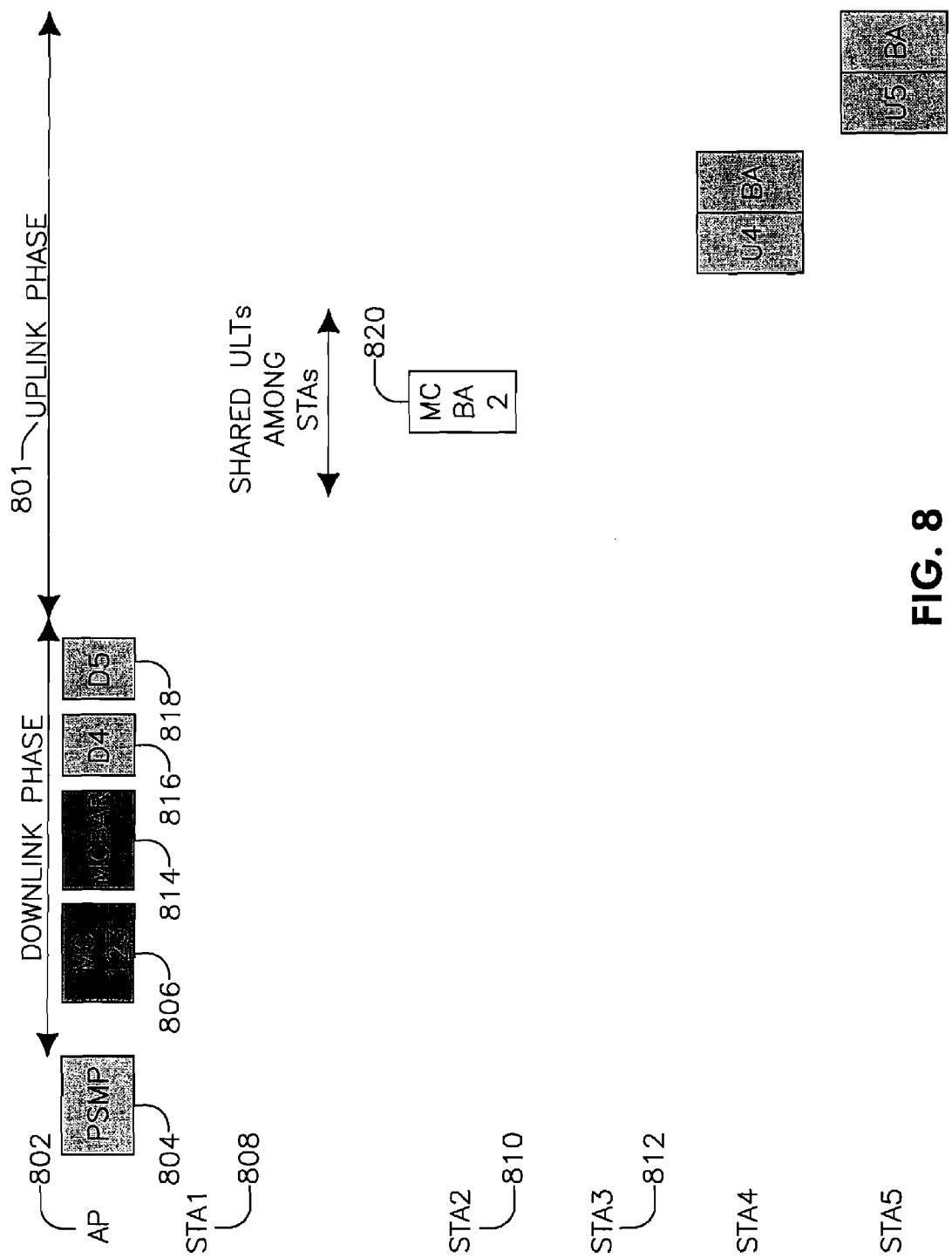
FIG. 8 is a signal diagram of an acknowledged or reliable multicast in accordance with an additional embodiment of the present invention.

FIG. 8 is a signal diagram of an acknowledged or reliable multicast in accordance with an additional embodiment of the present invention. In accordance with FIG. 8, during the scheduled downlink phase 801 of the PSMP 804, the AP 802 transmits a multicast signal 806 to STA1 (808), STA2 (810) and STA3 (812). Also, the AP 802 transmits the new MCBAR 814, telling STA1, STA2 and STA3 that a BA has been requested by the AP 802. The request is performed using an MCBAR 814. Also shown are unicast data signal D4 (816) and D5 (818). However, in this embodiment, STA1, STA2 and STA3 share an MCBA 820 in the scheduled uplink phase 801. That is, STA1, STA2 and STA3 send their acknowledgements 820 during a scheduled shared ULT 801.

In order to increase efficiency, negative acknowledgements can be used for the stations that did not receive all or some of the transmitted multicast frames. For example, if STA2 did not receive the multicast transmission from the AP 802 it would transmit a negative acknowledgment 820. In this manner, the PSMP 804 does not schedule a dedicated ULT for each station involved in the multicast transmission. The STA1, STA2 and STA3 share the ULT using an ULT that stations contend in order to access, for example, by using enhanced distributed channel access (EDCA).

Figure 1:
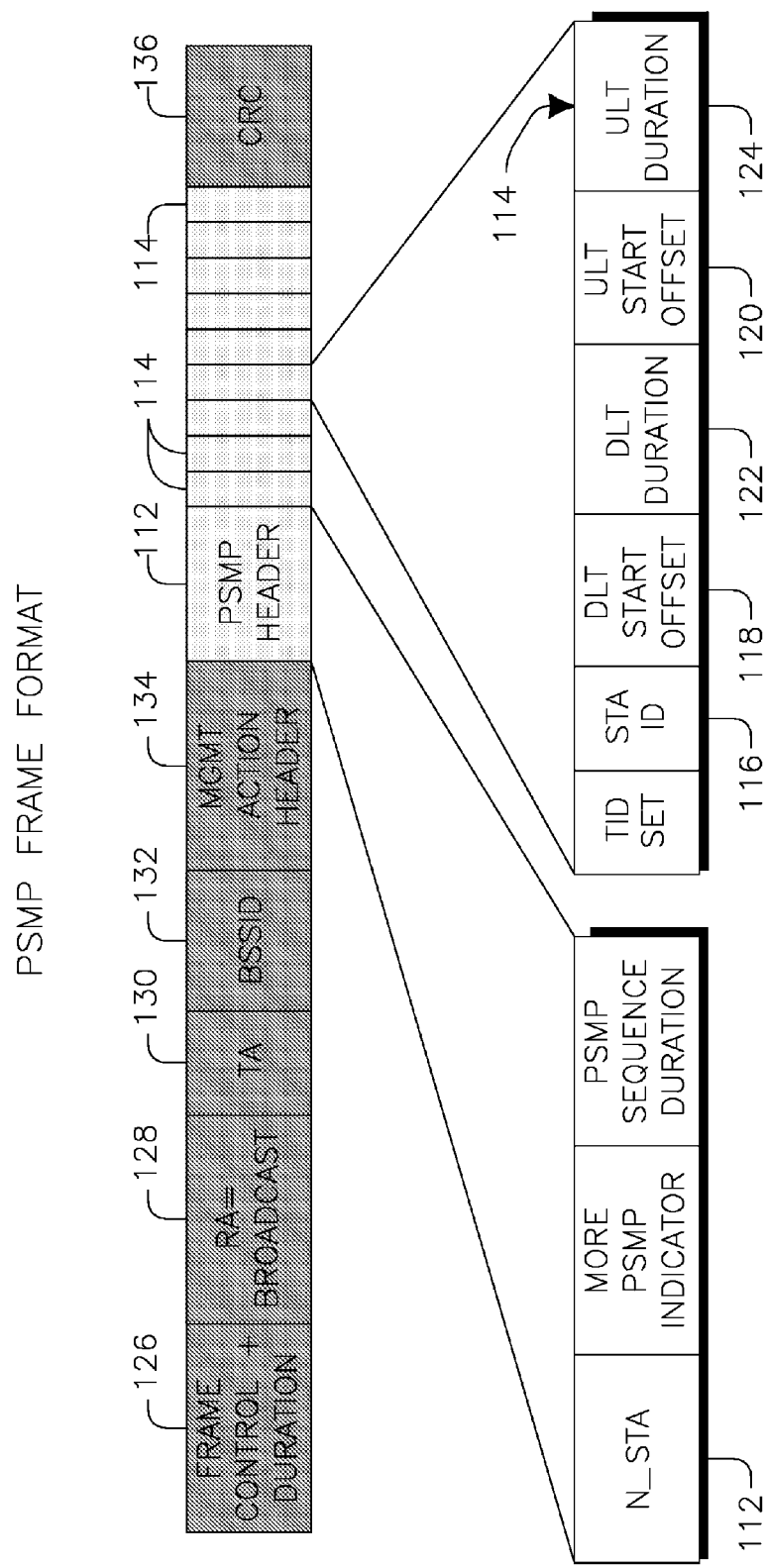
FIG. 1 shows a prior art PSMP frame format.
Figure 2:
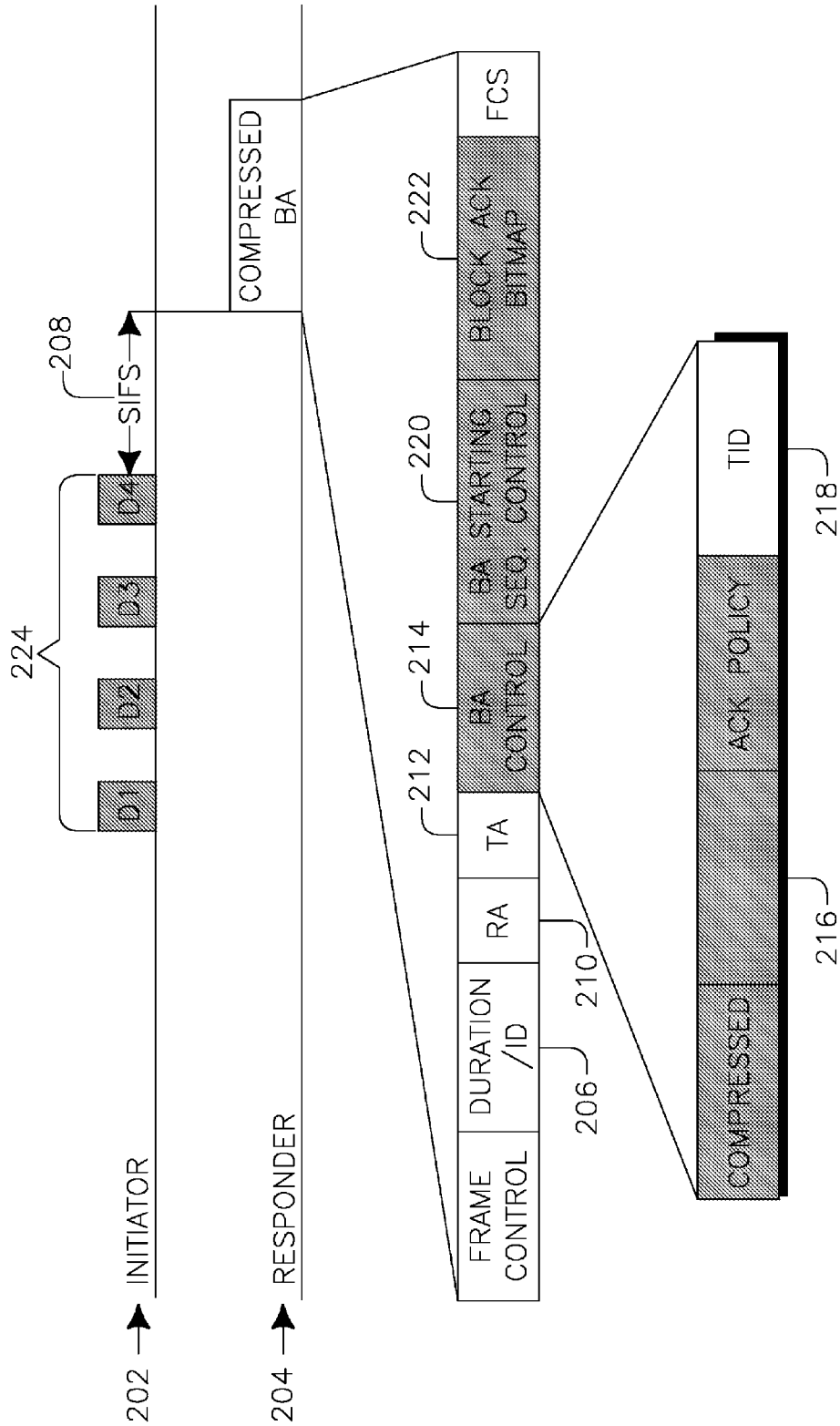
FIG. 2 is a diagram of a prior art enhanced BA mechanism.
Figure 3:
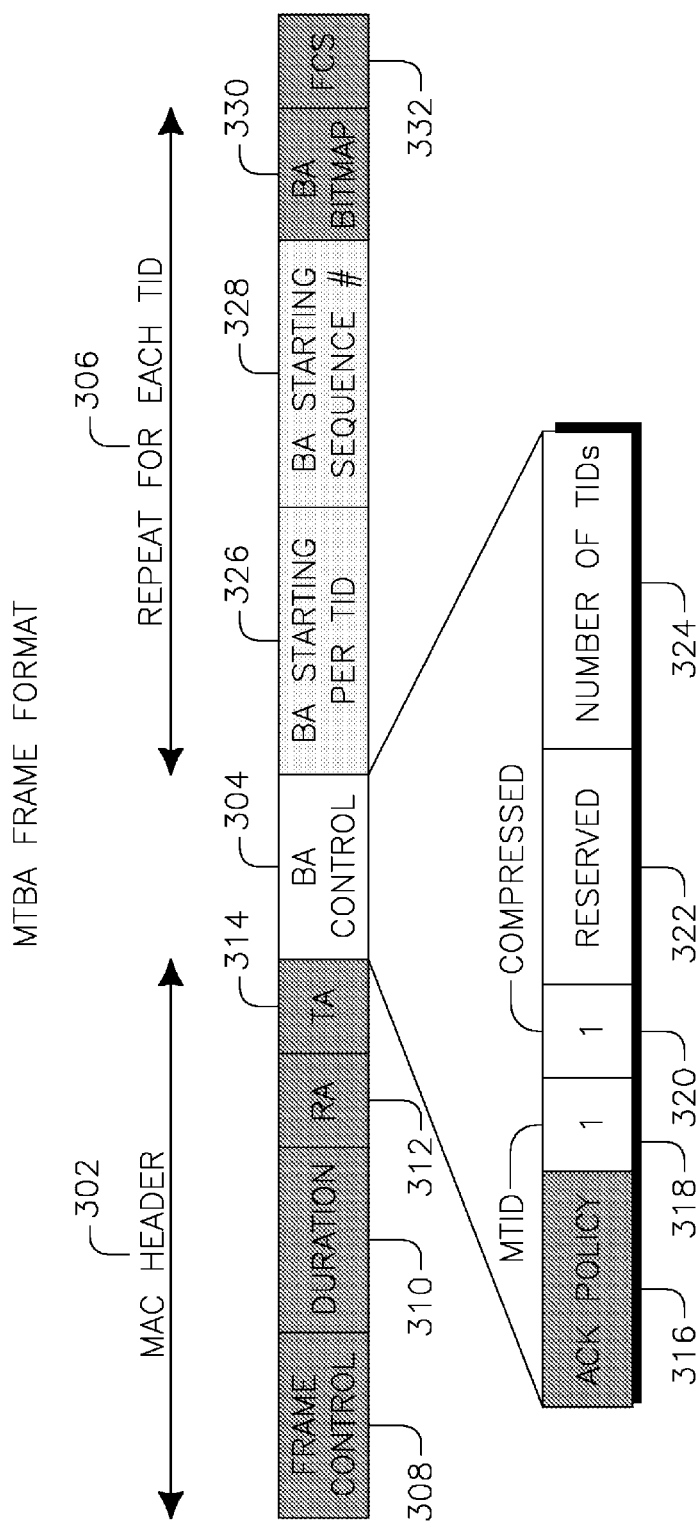
FIG. 3 is a diagram of a prior art MTBA frame format.
Figure 4:
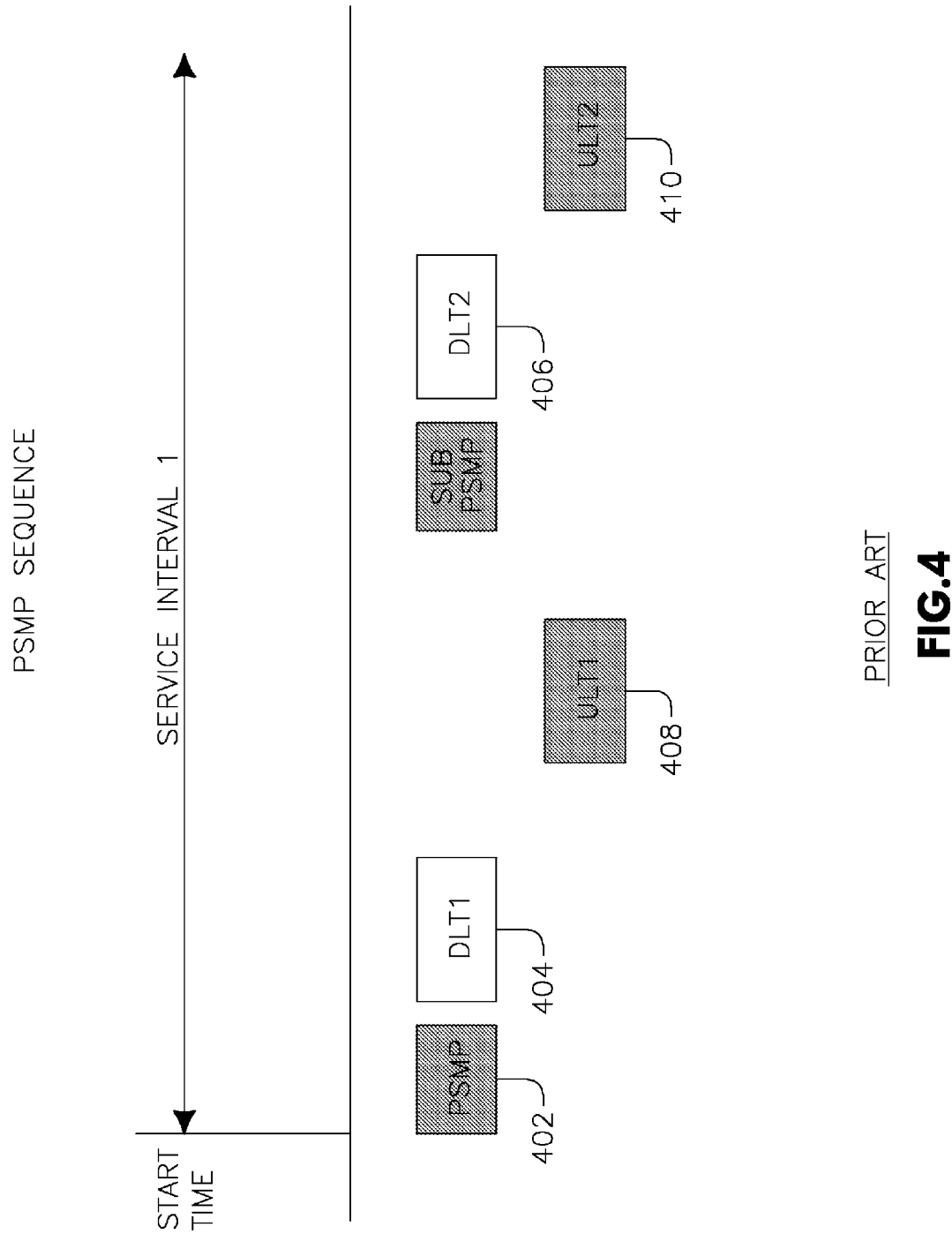
FIG. 4 is a diagram of a prior art PSMP sequence.
Figure 5:
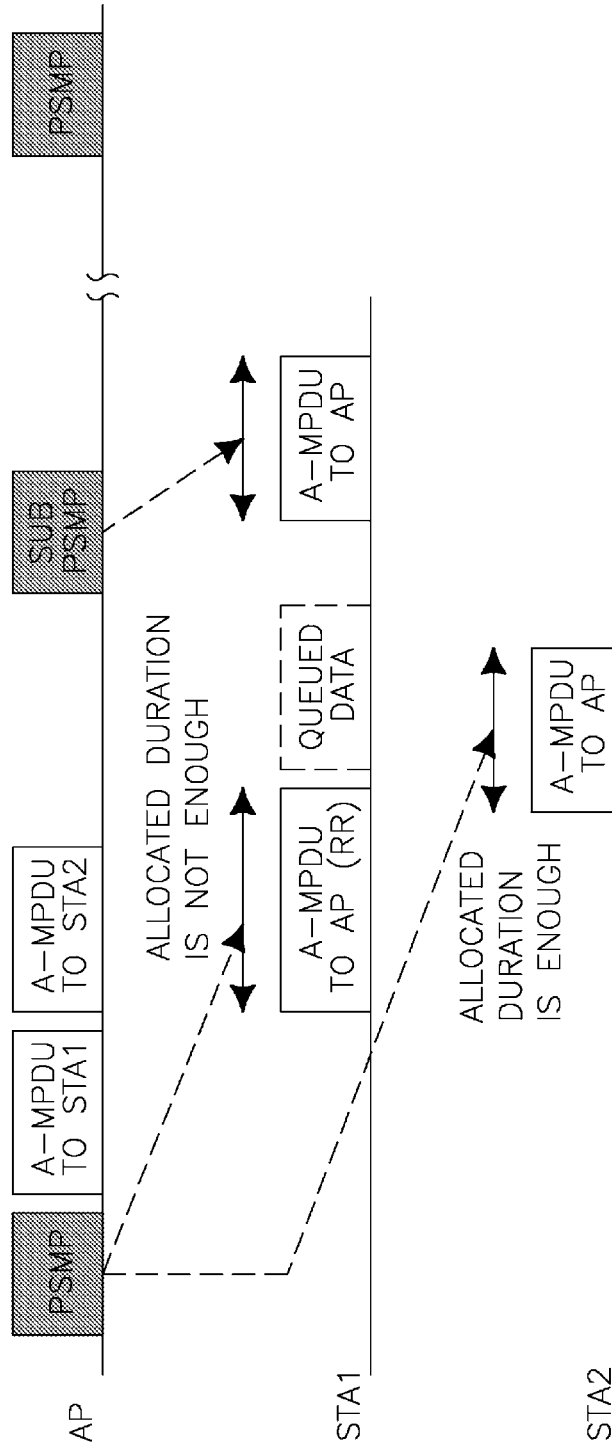
FIG. 5 is an exemplary diagram of a prior art PSMP resource request.
Figure 6:
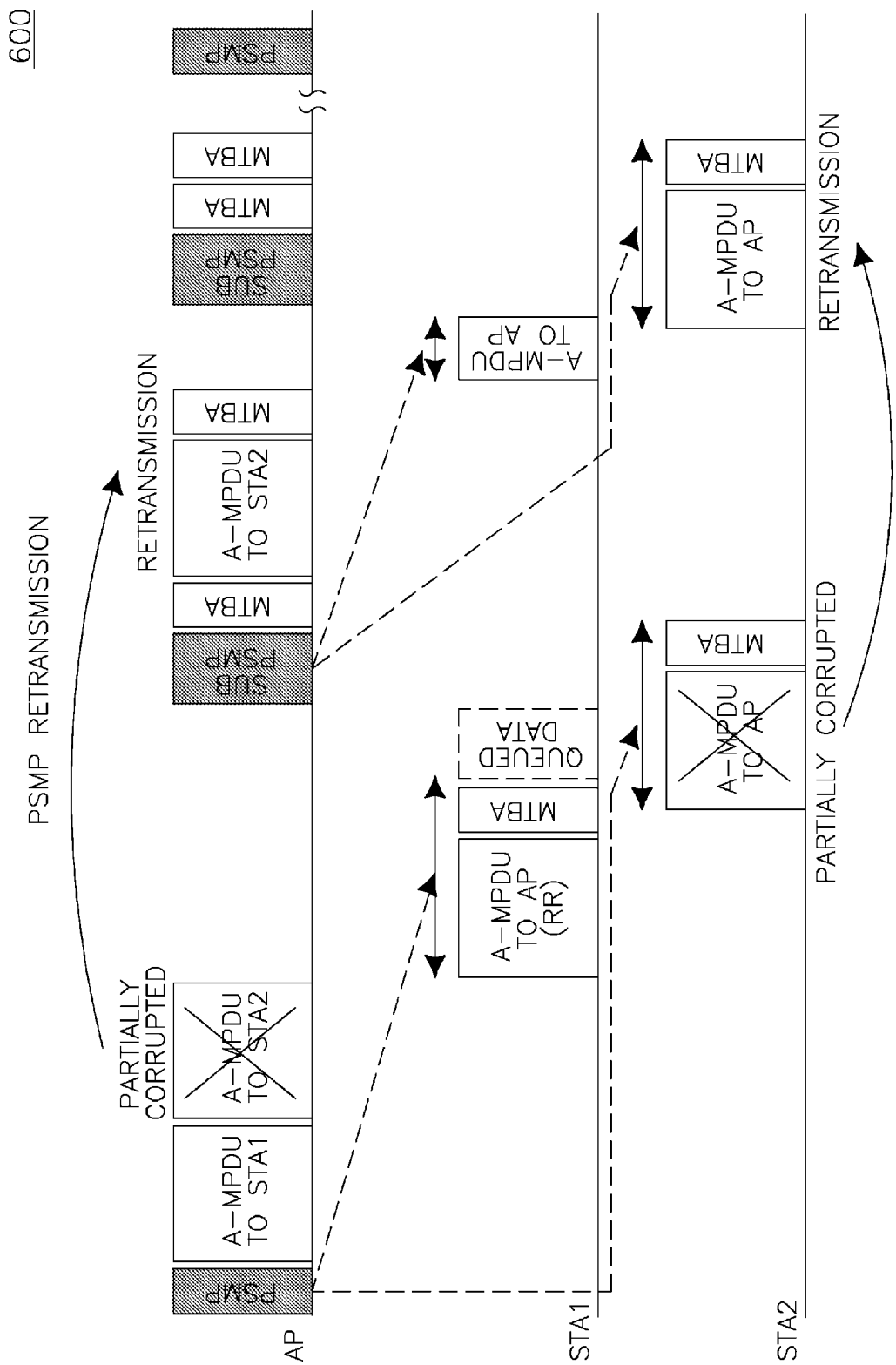
FIG. 6 is an exemplary diagram of a prior art PSMP retransmission.
Figure 9:
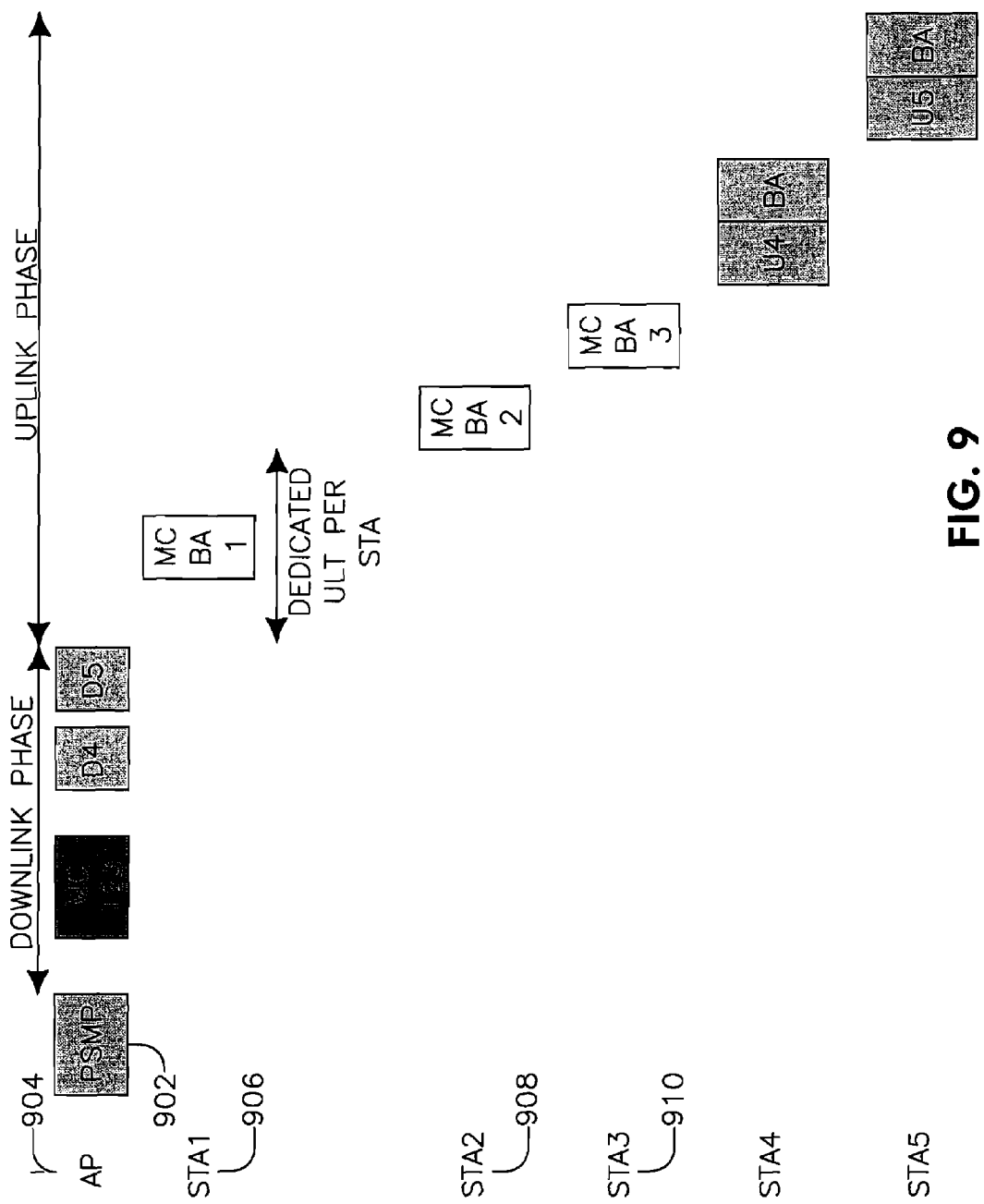
FIG. 9 is a signal diagram of an acknowledged or reliable multicast in accordance with another embodiment of the present invention.

FIG. 9 is a signal diagram of acknowledged or reliable multicast in accordance with another embodiment of the present invention. In this embodiment, the PSMP frame 902 contains a field that informs the STA1, STA2 and STA3 (906, 908 and 910 respectively) that a multicast acknowledgment with either positive and/or negative acknowledgements is required. Referring back to FIG. 1, the PSMP frame 100 contains five (5) fields in front of the PSMP header (126, 128, 130, 132 and 134), the PSMP header 112 itself, and, for each WTRU, a plurality of fields 114 containing sub-fields that contain scheduling information for the uplink and the downlink signal. The PSMP frame 100 ends with a 4 byte cyclic redundancy check (CRC) field 136. A single bit that may be introduced into, or is currently unused or reserved in any one of these fields may be used to indicate a multicast acknowledge request.

Figure 10:
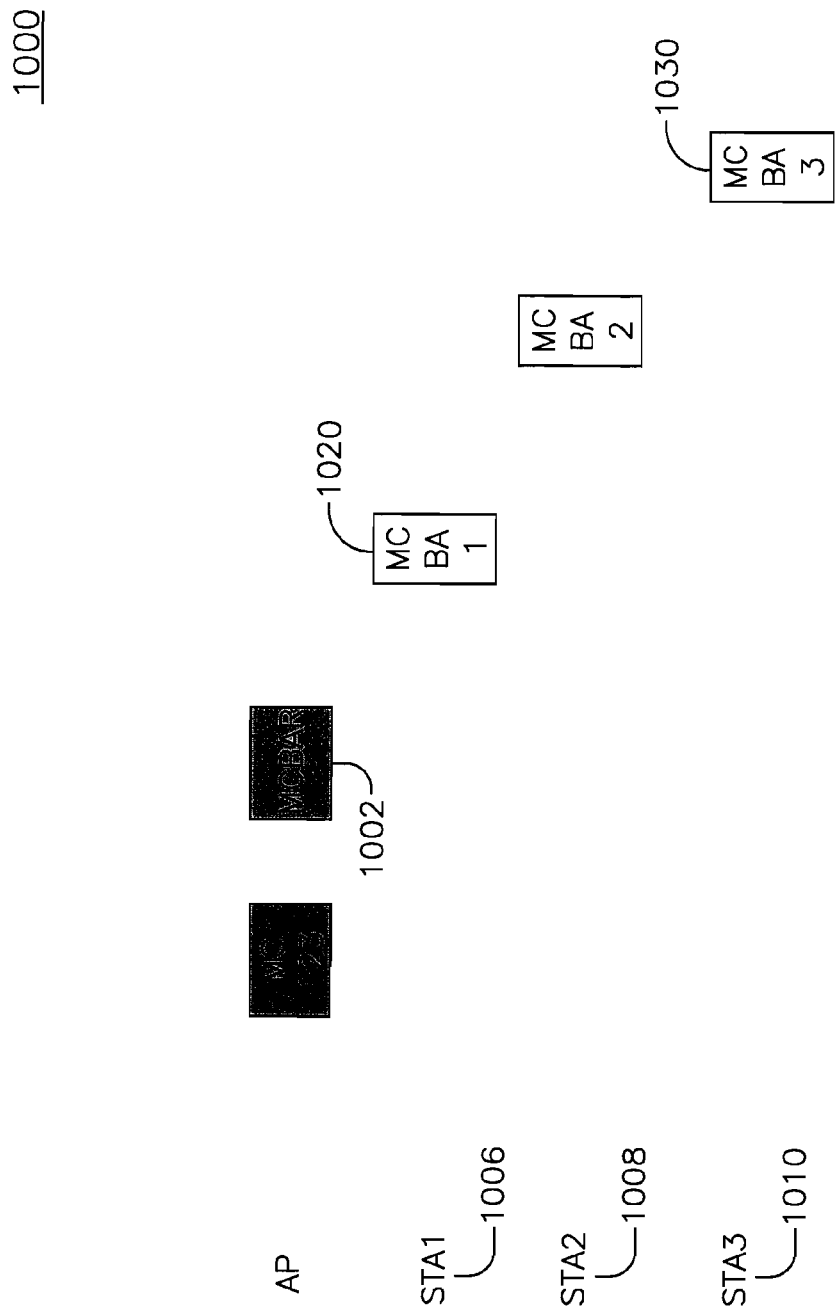
FIG. 10 is a signal diagram of an acknowledged or reliable multicast in accordance with another embodiment of the present invention.

FIG. 10 is a signal diagram of an acknowledged or reliable multicast in accordance with another embodiment of the present invention. This is similar to the embodiments described in relation to FIGS. 7, 8 and 9, with the exception that the stations that did not receive the multicast frames, for example STA1 1006 and STA3 1010, but received the MCBAR 1002 generate negative acknowledgements that are sent after such stations contend for the medium, for example, using EDCA. STAs 1006, 1008 and 1010 (designated as STA1, STA2 and STA3, respectively) will know to expect a multicast frame if they received the MCBAR 1002. As shown in FIG. 10, STA1 1006 and STA3 1010 may transmit an MCBA 1020, 1030 that contain a negative acknowledgement, in response to receiving the MCBAR 1002.

In addition to improving the PSMP function so that a WTRU receives a multicast acknowledge request, the PSMP function can include, in the same frame as the MCBAR, an acknowledgement mode indication bit or bits.

Additionally, as part of the signaling improvements, the PSMP, BAR, or MTBAR frame may solicit broadcast/multicast acknowledgements that are considered as an implicit BAR for multicast.

The high throughput (HT)-Control field may be enhanced to contain signaling information related to the support of the broadcast/multicast acknowledgements feature, such as a signal to solicit/request a broadcast/multicast acknowledgement. In addition, the HT-Capability Information Elements (IEs) may be enhanced to carry information about the level of support a device provides with respect to the broadcast/multicast acknowledgements feature. The HT-Capability IEs may also be enhanced to carry information about the level of support a device provides with respect to any broadcast/multicast acknowledgements feature, or reliable broadcast/multicast feature.

Additionally, the HT-Control field, or any control field, or any field within the WLAN frame that contains information related to the multicast feature in general, and to the acknowledged multicast feature in particular, may be improved to include indications for acknowledgments and/or broadcast.

Sequence numbers for multicast traffic may be added into a PSMP sequence to indicate a multicast data broadcast. For example, the PSMP frame may indicate that it will transmit multicast frames that have sequence numbers 3, 4, 5 and 6. In this manner, the WTRUs will know to expect certain multicast frames, and can respond accordingly.

More than one broadcast/multicast periods may be provided within a PSMP sequence, as opposed to the current PSMP specification which allows for only one broadcast/multicast period which is at the beginning of the PSMP. In addition to the normal use for broadcast/multicast, more multiple broadcast/multicast periods might also be used to increase the reliability of transmissions in the form of redundancy or time diversity.

The broadcast/multicast frames within a broadcast/multicast period may also be repeated a certain number of times. The number of repeats is determined or configured based on system parameters either statically or dynamically during system operation. This provides redundancy in order to enhance reliability.

Multicast frames may be converted or translated into unicast frames so that they can be transmitted in separate unicast slots in the DLTs, with or without ULT allocations for acknowledgements. This allows optimization of throughput and reliability on a per WTRU basis while adapting to specific link conditions. Even though this can lead to the loss in efficiency provided by multicast, it still provides PSMP efficiency and can be practically useful in a light traffic load scenario.

The AP may conduct retransmissions due to unacknowledged or negatively acknowledged multicast frames either in multicast mode or in unicast mode. This may be performed as part of a subsequent PSMP sequence or independent of and external to a PSMP sequence.

Transmissions of multicast frames and/or retransmissions of multicast frames that were unacknowledged or negatively acknowledged may occur during any mode or phase of a downlink transmission, such as, for example, outside of a PSMP sequence. In this case, the AP accesses the medium to poll a WTRU. Such a WTRU may need to remain awake outside PSMP if it did not correctly receive the frame inside the PSMP period.

Any combination of one or more of all the previous embodiments can also be possible to realize reliable (acknowledged) multicast service in the 802.11n standard. These embodiment are also applicable to other WLAN or cellular (e.g. 3GPP) standard. Similarly, any combination of one or more of all the previous embodiments may be used.

Figure 11:
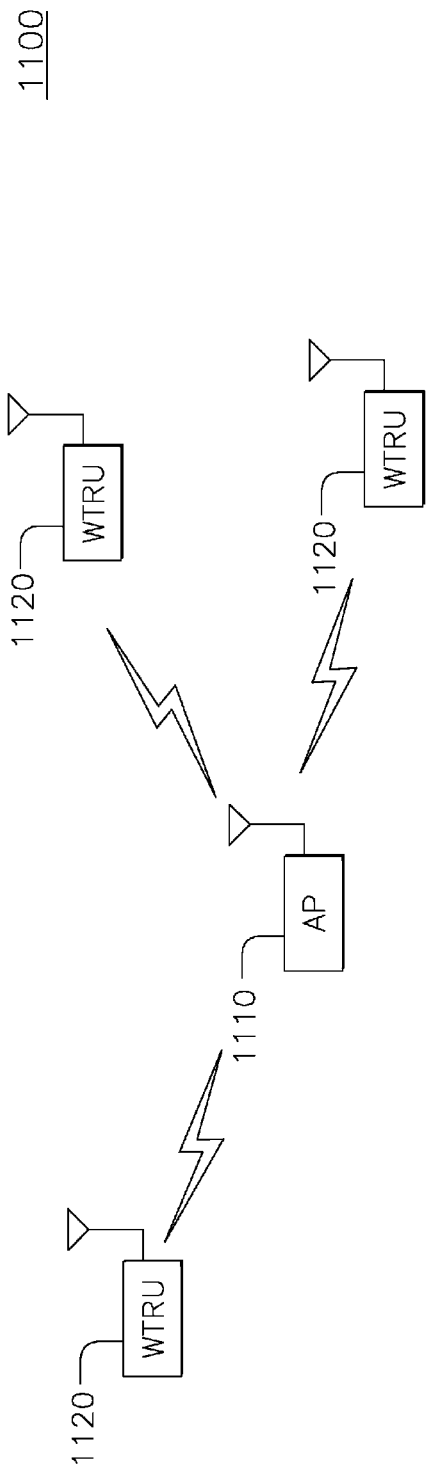
FIG. 11 shows an exemplary wireless system, including an access point (AP) and a plurality of wireless transmit/receive units (WTRUs), configured in accordance with the present invention.

Turning now to FIG. 11, there is shown an exemplary wireless communication system 1100 configured in accordance with the present invention. The wireless communication system 1100 includes a plurality of wireless communication devices, such as an AP 1110 and a plurality of WTRUs 1120, capable of wirelessly communicating with one another. Although the wireless communication devices depicted in the wireless communication system 1100 are shown as APs and WTRUs, it should be understood that any combination of wireless devices may comprise the wireless communication system 1100. That is, the wireless communication system 1100 may comprise any combination of APs, WTRUs, stations (STAs), and the like.

For example, the wireless communication system 1100 may include an AP and client device operating in an infrastructure mode, WTRUs operating in ad-hoc mode, nodes acting as wireless bridges, or any combination thereof. Additionally, in a preferred embodiment of the present invention, the wireless communication system 1100 is a wireless local area network (WLAN). However, the wireless communication system 100 may be any other type of wireless communication system.

Figure 12:
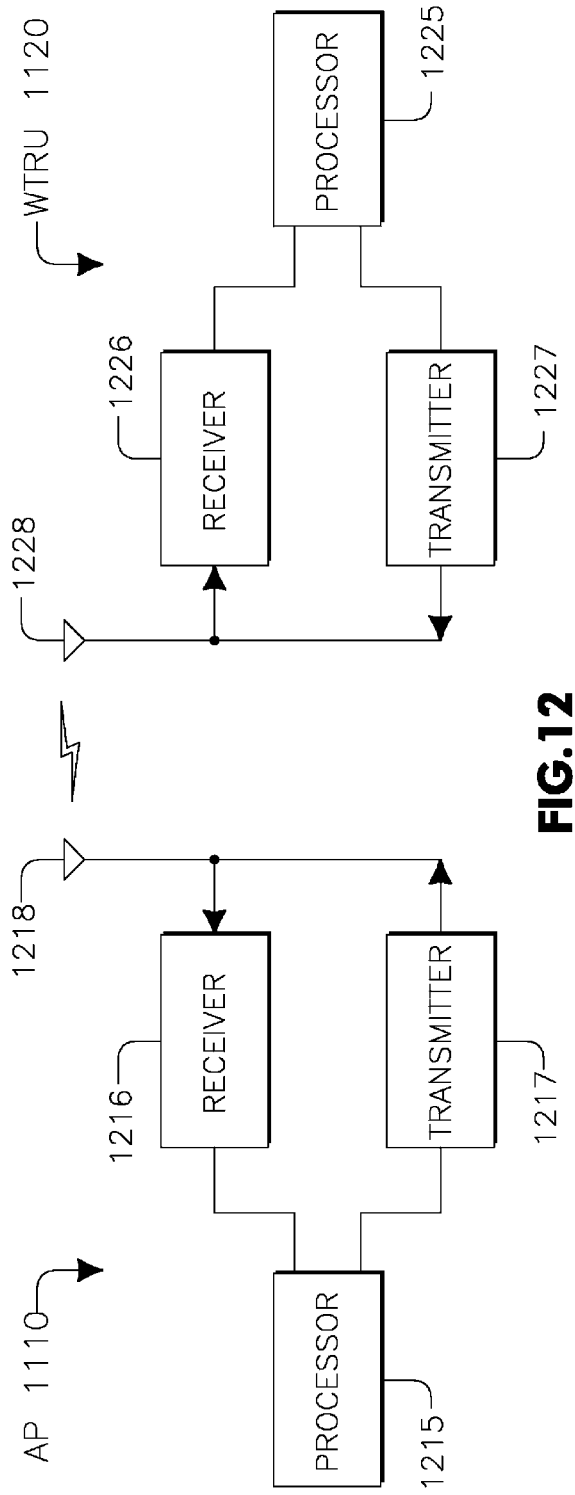
FIG. 12 is a functional block diagram of an AP and a WTRU of the wireless communication system of FIG. 11.

FIG. 12 is a functional block diagram of an AP 1210 and a WTRU 1120 of the wireless communication system 1100 of FIG. 11. As shown in FIG. 12, the AP 1110 and the WTRU 1120 are in wireless communication with one another. In addition to the components that may be found in a typical AP, the AP 1110 includes a processor 1215, a receiver 1216, a transmitter 1217, and an antenna 1218. The processor 1215 is configured to generate, transmit, and receive data packets in accordance with the present invention. The receiver 1216 and the transmitter 1217 are in communication with the processor 1215. The antenna 1218 is in communication with both the receiver 1216 and the transmitter 1217 to facilitate the transmission and reception of wireless data.

Similarly, in addition to the components that may be found in a typical WTRU, the WTRU 1120 includes a processor 1225, a receiver 1226, a transmitter 1227, and an antenna 1228. The processor 1225 is configured to generate, transmit, and receive data packets in accordance with the present invention. The receiver 1236 and the transmitter 1227 are in communication with the processor 1225. The antenna 1228 is in communication with both the receiver 1226 and the transmitter 1227 to facilitate the transmission and reception of wireless data.

Figure 13:
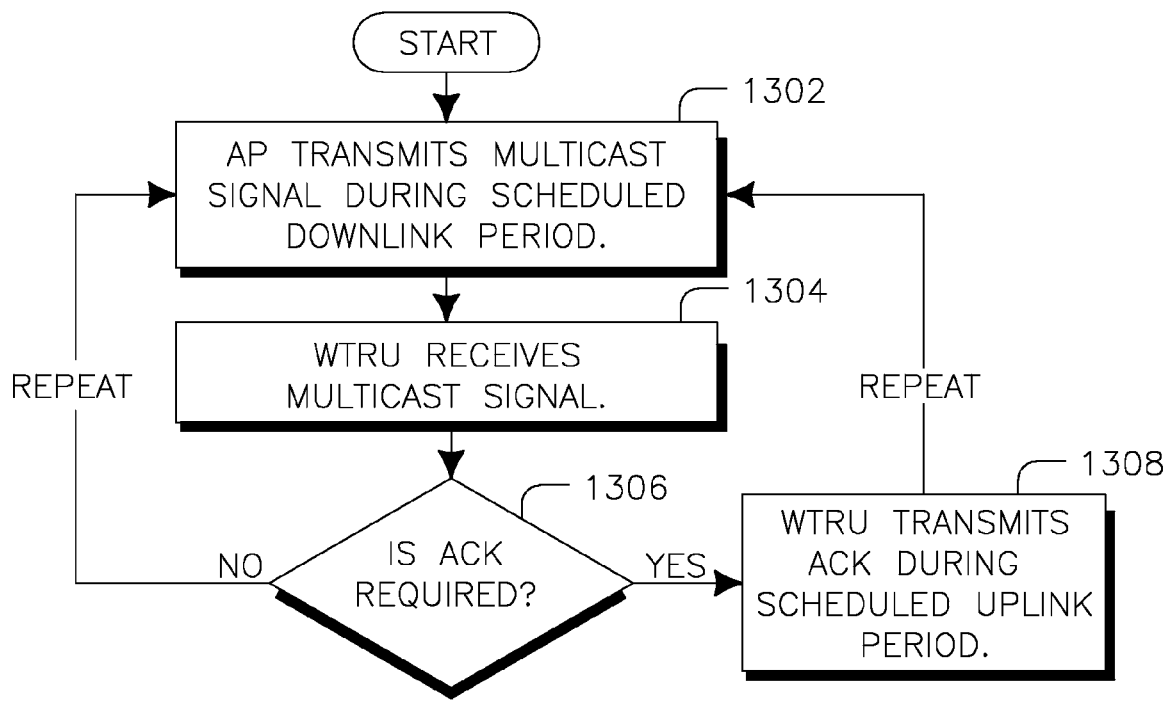
FIG. 13 is a flow diagram of a method for reliable multicast in accordance with the present invention.

FIG. 13 is a flow diagram of a method for reliable multicast 1300 in accordance with the present invention. An AP transmits a multicast signal during the interval schedule by the PSMP function at step 302. At step 304, a WTRU receives the multicast signal. At step 306, the WTRU determines if the signal contains a MCBAR. If the AP transmitted a MCBAR, at step 1308, the WTRU transmits an ACK to the AP. If the AP did not transmit an MCBAR, no acknowledgment is required from the WTRU. The WTRU will then wait for the next multicast signal from the AP.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for acknowledged multicast operation in a wireless station (STA), the method comprising:
    receiving a multicast block acknowledgement request (MCBAR) during a first interval based on enhanced distributed channel access (EDCA), wherein the MCBAR indicates which of a plurality of STAs is requested to transmit an acknowledgement (ACK), and wherein the MCBAR includes a field that indicates a level of support for multicast capabilities;
    on a condition that a multicast signal is received, transmitting an ACK to a base station during a second interval based on EDCA, on a condition that the STA is one of the plurality of STAs requested to transmit an ACK; and
    on a condition that a multicast signal is not received, transmitting a negative ACK (NACK) to the base station during the second interval based on EDCA.

2. The method of claim 1 wherein the MCBAR indicates a plurality of multicast frame sequence numbers.

3. The method of claim 1 wherein the transmitted ACK is a bitmap representative of a frame status.

4. The method of claim 1, further comprising receiving a retransmitted multicast signal.

5. The method of claim 1 wherein the second interval is a shared interval.

6. The method of claim 1 wherein the MCBAR further comprises an acknowledgment mode indicator.

7. The method of claim 1 further comprising converting the multicast signal into a plurality of unicast frames.

8. The method of claim 1 further comprising receiving a retransmitted multicast signal a predetermined number of times during the first scheduled interval.

9. The method of claim 1 wherein the ACK is transmitted a predetermined number of times during the second scheduled interval.

10. The method of claim 7 wherein the plurality of unicast frames are received in separate unicast slots in downlink transmissions (DLTs) including a plurality of uplink transmission (ULT) allocations for acknowledgements.

11. The method of claim 7 wherein the plurality of unicast frames are received in separate unicast slots in downlink transmissions (DLTs) without an uplink transmission (ULT) allocation for an acknowledgement.

12. A method for acknowledged multicast operation in an access point (AP), the method comprising:
    transmitting a multicast signal and a multicast block acknowledgement request (MCBAR) at an interval based on enhanced distributed channel access (EDCA), wherein the MCBAR indicates which of a plurality of stations (STAs) is requested to transmit an acknowledgement (ACK), and wherein the MCBAR includes a field that indicates a level of support for multicast capabilities; and
    receiving, in response to the MCBAR, an ACK from a station (STA) that received a multicast signal and a negative ACK (NACK) from a STA that did not receive the multicast signal.

13. The method of claim 12, wherein the MCBAR includes information on a broadcast frame's sequence numbers.

14. The method of claim 12 wherein the MCBAR includes information on the number of broadcast frames that will be transmitted.

15. A wireless station (STA) for multicast operation, the STA comprising:
    a receiver configured to receive a multicast block acknowledgement request (MCBAR) during an interval based on enhanced distributed channel access (EDCA), wherein the MCBAR indicates which of a plurality of STAs is requested to transmit an acknowledgement (ACK), and wherein the MCBAR includes a field that indicates a level of support for multicast capabilities; and
    a transmitter configured to transmit an acknowledgment (ACK) in a time slot determined by EDCA, on a condition that the STA receives a multicast frame and on a condition that the STA is one of the plurality of STAs requested to transmit an acknowledgement, and wherein the transmitter is configured to transmit a negative ACK (NACK) on a condition that a multicast frame is not received.

16. The wireless STA of claim 15, wherein the transmitter is configured to transmit a plurality if ACKs in a single time slot.

17. The wireless STA of claim 15, wherein the transmitter is configured to transmit the ACK without receiving the MCBAR.

* * * * *

UNITED STATES PATENT AND TRADEMARK OFFICE
CERTIFICATE OF CORRECTION

| | |
|---|---|
| PATENT NO. | : 8,023,453 B2 |
| APPLICATION NO. | : 11/674391 |
| DATED | : September 20, 2011 |
| INVENTOR(S) | : Sammour et al. |

It is certified that error appears in the above-identified patent and that said Letters Patent is hereby corrected as shown below:

IN THE CLAIMS

At Claim 16, column 10, line 48, after "a plurality" delete "if" and insert --of--.

Signed and Sealed this
Seventh Day of February, 2012

David J. Kappos
*Director of the United States Patent and Trademark Office*